Nov. 16, 1948. R. A. HARTMAN 2,453,980
FASTENING DEVICE FOR CABLES, WIRES, OR THE LIKE
Filed Oct. 28, 1946
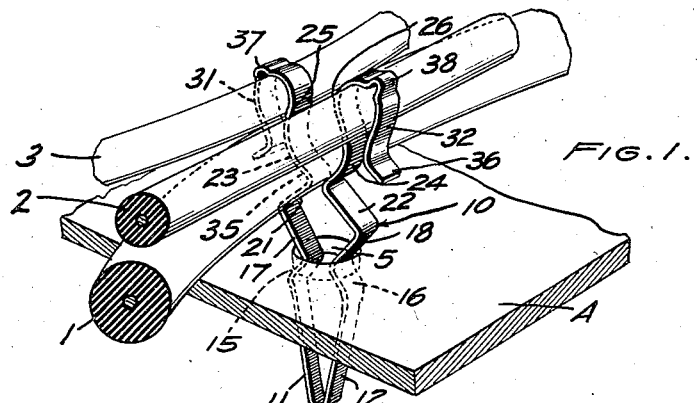
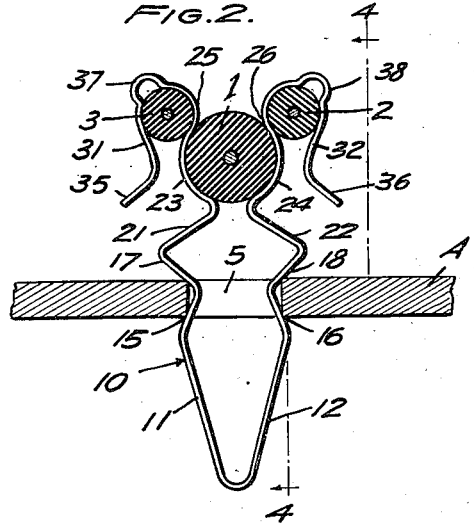
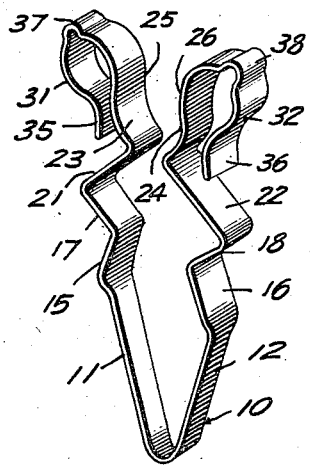
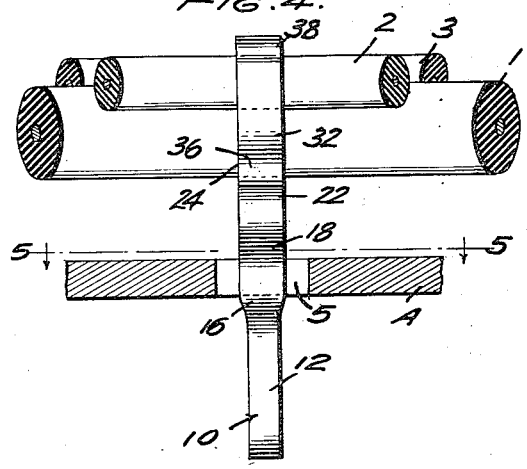
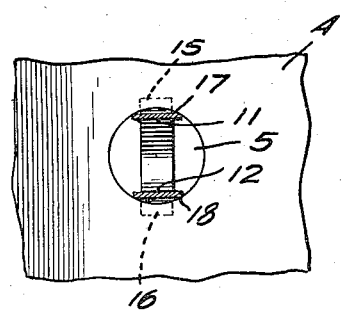
INVENTOR
RICHARD A. HARTMAN
BY
H. G. Lombard
ATTORNEY Patented Nov. 16, 1948

2,453,980

UNITED STATES PATENT OFFICE 2,453,980

FASTENING DEVICE FOR CABLES, WIRES, OR THE LIKE

Richard A. Hartman, Cleveland, Ohio, assignor to Tinnerman Products, Inc., Cleveland, Ohio, a corporation of Ohio Application October 28, 1946, Serial No. 706,227

3 Claims. (Cl. 24—73)

This invention relates in general to spring clip fastening devices and deals, more particularly, with an improved clip construction for attaching in multiple various types of conduits such as cables, wires, tubes and the like, onto a panel, plate or other support.

Many installations comprise several wires, cables, rods, tubes, and similar objects, or a combination of such objects, which extend in the same general direction in close proximity to each other. When the various conduits are separately secured by individual fasteners, an entirely inordinate amount of time is required which frequently results in excessive costs for labor and other increased and unwarranted expenses in mass production methods of assembly.

The present invention has for a primary object the provision of a clip fastener for securing in a minimum of time and effort a plurality of cables, wires or other conduits in an installation such as described, and which so secures the conduits to the support, individually and severally, that they are not subject to loosening or displacement under the most severe conditions of vibration or shock.

A further object of the invention is to provide such a clip fastener which secures the several conduits in spaced relation to the support in a manner to avoid dangerous wear of the same from contact with the support.

Another object of the invention is to provide a clip fastener of this character in an improved construction by which the several conduits in an installation are secured by separate resilient clamping means apart from each other so as to prevent chafing or rubbing of the conduits as a result of vibratory motion, or the like, taking place in the installation.

A further object of the invention is to provide a clip fastener of the kind described which is strong, durable and reliable and is adapted for economical quantity production at comparatively low cost in that it may be manufactured from standard sheet metal strip stock with little loss or waste of material.

Further objects and advantages of the invention will be readily apparent as the following description proceeds with reference to the accompanying drawings, for purposes of illustration but not of limitation, in which like reference characters designate like parts throughout the same, and in which:

Fig. 1 is a perspective view of an installation comprising a plurality of wires or other conduits secured by the improved clip fastener of the invention;

Fig. 2 is a sectional view of an installation showing the improved clip fastener in edge elevation as applied to an opening in a panel or other support to secure a plurality of wires or conduits in multiples;

Fig. 3 is a perspective view of the clip fastener per se;

Fig. 4 is a sectional view of Fig. 2 taken on line 4—4 looking in the direction of the arrows, and showing the clip fastener in side elevation; and, Fig. 5 is a sectional view of Fig. 4, taken on line 5—5 looking in the direction of the arrows.

Referring now, more particularly, to the drawings, Figs. 1 and 2 illustrate the application and use of a preferred form of clip fastener of the invention, shown in Fig. 3, as employed for securing in multiple a plurality of conduits such as insulated wires 1, 2, and 3, respectively. The clip is adapted to secure, in an analogous relation, similar objects such as tubes, rods, pipes, cables, etc. or a combination of such, as in an automobile installation wherein a gasoline line or pipe would be secured between a pair of ignition wires extending in the same general direction. The clip fastener is designed to be applied to fastening engagement in an aperture in a support defined, for example, by the chassis frame or dash panel of an automobile or a similar supporting plate or panel in any structure of general utility. The supporting panel or plate A, may be of any suitable material such as sheet metal, wood, fibre board or the like, but usually is in the form of a metallic panel or plate-like element which is provided with fastener receiving openings at regular intervals and at suitably spaced points along which the conduits extend in attached position. Such fastener receiving openings may be either round, rectangular or of any other suitable outline but generally are provided in the manner of circular recesses 5 which involve the least cost inasmuch as only the simplest punching or drilling tools are required.

The clip fastener, designated generally 10, is made in a highly simplified design from a relatively small, inexpensive length of any suitable sheet metal or wire strip material, preferably of a spring metal nature such as spring steel or cold rolled steel having spring characteristics, with the size, finish and thickness thereof selected according to service requirements and the predetermined size and nature of the parts of the installation. The fastener is readily manufactured by simple bending and forming operations by which the strip is bent intermediately to provide a generally V-shaped shank comprising a pair of spaced shank legs 11, 12, which are united at the point or leading end of the fastener and extend in diverging relation to define compressible and resilient guide surfaces permitting ready application of the fastener into an opening in a panel, plate or other supporting member.

At suitably spaced points from the leading end of the fastener, the shank legs 11, 12 are bent inwardly toward each other to provide inclined cam shoulders 15, 16, in converging relation and which shoulders have a normal spacing greater than the diameter of the panel opening 1 and a length greater than the predetermined thickness of the panel A. Similar shoulders may be provided in various equivalent constructions as by fingers carried by or struck out from the shank legs 11, 12, or wings, or the like, formed on the longitudinal edges of the shank legs and provided with tapered edges defining the desired shoulders adapting the shank of the fastener for snap fastening engagement in the panel opening 5. In the present example, the converging cam shoulders 15, 16 are advantageous in that they are simple continuations of the shank legs 11, 12 and may be of such length as to permit a single size fastener to be attached to panels of different thicknesses, within limits. Preferably the shank legs 11, 12, are of slightly less width than the cam shoulders 15, 16, as seen in Fig. 4, in order to facilitate the initial application of the shank into the panel opening 5, and said shank legs otherwise may be provided with longitudinally extending ribs or corrugations to stiffen the same if necessary or desirable.

Adjacent the cam shoulders 15, 16, there are provided outwardly bent portions 17, 18 in diverging relation defining upper cam shoulders in spaced relation to the lower cam shoulders 15, 16 respectively, and adapted to cooperate therewith in engaging opposite faces of the panel adjacent the panel opening 5 to retain the fastener in applied fastening position. The converging relation of the shoulders 15, 16 coupled with the diverging relation of the associated upper shoulders 17, 18, is such as to provide cooperating, spaced, re-entrant panel engaging shoulders 15, 17, and 16, 18, adapted to receive therebetween panels of various thicknesses and otherwise to seat the fastener automatically in most effective fastening engagement in a fastener receiving opening in any such panel.

Head members 21, 22 are provided in continuation of the upper shoulders 17, 18 and include outwardly curved, arcuate spring arms 23, 24, conforming generally to the contour of the central conduit 1 to clamp the same firmly and rigidly in the most effective manner. Adjacent the ends of said spring arms 23, 24, the spring arms are curved inwardly and then outwardly in sinuous portions 25, 26. The inner surfaces of said sinuous portions 25, 26 define inner cam lips that retain the conduit 1 in snap fastened engagement between the spring arms 23, 24 and otherwise define a flared entrance to the space between said spring arms which facilitates application of the conduit 1 to snap fastened position between said spring arms 23, 24, as best seen in Fig. 2.

The spring arms 23, 24 merge into outward return bends defining return bent spring fingers 31, 32 adapted to grip the conduits 2, 3, in cooperation with the outer surfaces of the associated spring arms 23, 24, respectively. Said spring fingers 31, 32 are inwardly biased to cooperate with the outer cam lips defined by the outer surfaces of sinuous portions 25, 26 on the spring arms 23, 24, to retain the conduits 2, 3, in snap fastened position. Thus, conduit 2 is retained by spring finger 32 in snap fastened position against spring arm 24, and conduit 3 is similarly retained by spring finger 31 against spring arm 23. The free ends of the spring fingers 31, 32 preferably terminate in outwardly flared tongues 35, 36, which facilitate the initial application of the conduits 2, 3, to attached position under said spring fingers 31, 32. When increased resiliency is desired in the spring fingers, they may be formed with suitable loops 37, 38, that provide for greater yielding movement of the spring fingers relative to the associated spring arms 23, 24.

With the improved spring clip provided in the general manner described and substantially as shown in Fig. 3, it will be understood that the fastener is employed in an installation such as shown in Figs. 1, 2 and 4 by applying the resilient shank legs 11, 12 of the fastener to secured position in the panel opening 5 either with the conduits 1, 2, and 3 preassembled therewith or individually attached thereto after the fastener is seated in applied fastening position in said panel opening 5. In either case, the shank of the fastener is easily and quickly secured in the panel opening 5 in a simple operation by which the leading end of the fastener is readily inserted into the panel opening 5, and as the fastener is pushed axially, the diverging shank legs 11, 12, are compressed against the edges of the panel opening until the lower cam shoulders 15, 16 pass therethrough and engage the lower corner edges of said opening as best seen in Fig. 2. These lower cam shoulders 15, 16 slide on the lower corner edges of the panel opening until they are automatically seated in most effective fastening position in engagement with such lower corner edges of the panel opening, depending on the thickness of the panel. The upper cam shoulders 17, 18 engage the upper corner edges of the panel opening in a similar manner. In this way, the cooperating cam shoulders 15, 17, and 16, 18 are adapted to engage effectively panels of different thicknesses and otherwise compensate for irregularities and manufacturing variations in the thickness of a supply of panels adjacent the fastener receiving openings therein. In any event, the oppositely disposed shoulders 15, 17 and 16, 18 cooperate to engage opposite faces of the panel adjacent the opening therein and thereby firmly and rigidly secure the fastener in applied fastening position.

When the conduits 1, 2, and 3 are preassembled with the fastener prior to securing the fastener to the panel in the manner just described, it will be understood that the conduits are attached in any desired order, either with the conduit 1 first snapped between the spring arms 23, 24 and the conduits 2, 3, then snapped under the spring fingers 31, 32, or vice versa. Likewise, when the fastener is first applied to fastening position in the panel opening, substantially as shown in Fig. 2, the conduits may be attached thereto in any desired order to be retained thereby in supported position by the elements of the spring arms 23, 24 and spring fingers 31, 32, as previously described.

In the event that it becomes necessary to remove the fastener from the panel, this is easily accomplished simply by compressing the shank legs 11, 12 as necessary for the cam shoulders 15, 16, Fig. 5, to lie within the outline of the opening 5 and thereby permit the fastener to be removed from the opening in an axial direction reverse to that in which it was applied. Thereafter, the fastener may be reapplied to a panel opening in the same or a similar installation in a repetition of the foregoing described procedure. In any removal of the fastener or disassociation of the parts of an installation, the conduits may be detached from the fastener in any order either before or after the fastener is removed from the panel opening.

Although the invention has been described with various references to its use in automobile installations, it will be understood that the invention is equally adaptable to a wide range and variety of applications in the construction of airplanes, radio and electrical apparatus and any other structure in which it is desired to support or attach in multiple a plurality of conduits or other objects to a panel, plate or other support in the general manner described.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with a specific example such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener for retaining a plurality of objects in separately attached and detachable relation comprising a strip of metal bent to provide a pair of spaced shank legs adapted to be compressed toward each other in fastening position in an opening in a support, cooperating spaced spring arms carried by said shank legs adapted to grip an object therebetween under the force of said shank legs in compressed condition in the opening, inwardly extending portions on said spring arms at the entrance to the space therebetween for retaining said object against removal from between said spring arms, one of said spring arms having an outward reversely extending spring finger adjoining the inwardly extending portion thereon defining a recess for retaining another object in close overlapping relation to the first named object with said inwardly extending portion disposed between the retained objects to prevent chafing thereof.

2. A fastener for retaining a plurality of objects in separately attached and detachable relation comprising a strip of metal bent to provide a pair of spaced shank legs adapted to be compressed toward each other in fastening position in an opening in a support, cooperating spaced spring arms carried by said shank legs adapted to grip an object therebetween under the force of said shank legs in compressed condition in the opening, inwardly extending portions on said spring arms at the entrance to the space therebetween for retaining said object against removal from between said spring arms, each of said spring arms having an outward reversely extending spring finger adjoining the inwardly extending portion thereon defining a recess for retaining another object in close overlapping relation to the first named object with said inwardly extending portions disposed between adjacent retained objects to prevent chafing thereof.

3. A fastener for retaining a plurality of objects in separately attached and detachable relation comprising a strip of metal bent to provide a pair of spaced shank legs adapted to be compressed toward each other in fastening position in an opening in a support, cooperating spaced spring arms carried by said shank legs adapted to grip an object therebetween under the force of said shank legs in compressed condition in the opening, inwardly extending portions on said spring arms at the entrance to the space therebetween for retaining said object against removal from between said spring arms, each of said spring arms having an outward reversely extending spring finger adjoining the inwardly extending portion thereon defining a recess for retaining another object in close overlapping relation to the first named object with said inwardly extending portions disposed between adjacent retained objects to prevent chafing thereof, said spring fingers having outward loops increasing the flexibility thereof and outwardly flared tongues on their extremities for facilitating application of the objects retained thereby.

RICHARD A. HARTMAN.

REFERENCES CITED

The following references are of record in the file of this patent:

UNITED STATES PATENTS

| Number | Name | Date |
|---|---|---|
| 1,873,881 | Hall | Aug. 23, 1932 |
| 1,945,585 | Wintrob | Feb. 6, 1934 |
| 1,995,370 | Walters | Mar. 16, 1935 |
| 2,068,932 | Quarnstrom | Jan. 26, 1937 |
| 2,100,017 | Van Uum | Nov. 23, 1937 |
| 2,128,005 | Lombard | Aug. 23, 1938 |
| 2,278,691 | Cotter | Apr. 7, 1942 |